United States Patent
Lee et al.

(10) Patent No.: US 10,981,790 B2
(45) Date of Patent: Apr. 20, 2021

(54) METHOD FOR PREPARING FUNCTIONALIZED GRAPHENE

(71) Applicant: LG Chem, Ltd., Seoul (KR)

(72) Inventors: Mi Jin Lee, Daejeon (KR); Won Jong Kwon, Daejeon (KR); Gwang Hoon Jun, Daejeon (KR); Ji Yeon Byeon, Daejeon (KR); Yu Ra Lee, Daejeon (KR)

(73) Assignee: LG Chem, Ltd.

( * ) Notice: Subject to any disclaimer, the term of this patent is extended or adjusted under 35 U.S.C. 154(b) by 245 days.

(21) Appl. No.: 16/303,427

(22) PCT Filed: Nov. 20, 2017

(86) PCT No.: PCT/KR2017/013192
§ 371 (c)(1),
(2) Date: Nov. 20, 2018

(87) PCT Pub. No.: WO2018/110846
PCT Pub. Date: Jun. 21, 2018

(65) Prior Publication Data
US 2019/0169032 A1    Jun. 6, 2019

(30) Foreign Application Priority Data

Dec. 14, 2016 (KR) .................. 10-2016-0170680

(51) Int. Cl.
*C01B 32/194* (2017.01)
*C09C 3/08* (2006.01)
*C09C 1/44* (2006.01)

(52) U.S. Cl.
CPC .............. *C01B 32/194* (2017.08); *C09C 1/44* (2013.01); *C09C 3/08* (2013.01); *C01B 2204/22* (2013.01);
(Continued)

(58) Field of Classification Search
CPC .............. C01B 32/194; C01B 2204/22; C01B 2204/24; C01P 2002/86; C01P 2002/88
See application file for complete search history.

(56) References Cited

U.S. PATENT DOCUMENTS

2009/0306276 A1   12/2009   Magnet et al.
2011/0046316 A1   2/2011    Schierholz et al.
(Continued)

FOREIGN PATENT DOCUMENTS

CN    102862976 A    1/2013
CN    102863824 B    4/2014
(Continued)

OTHER PUBLICATIONS

English machine translation of CN102863824 (2014).*
(Continued)

*Primary Examiner* — Richard M Rump
(74) *Attorney, Agent, or Firm* — Lerner, David, Littenberg, Krumholz & Mentlik, LLP (57) ABSTRACT

The present invention relates to a method for preparing a functionalized graphene. The method for preparing a functionalized graphene according to the present invention can functionalize graphene by a simple method and does not use any other substance other than graphene and a salt containing a double bond, thereby enabling functionalization of graphene while exhibiting characteristics inherent to graphene.

7 Claims, 9 Drawing Sheets

(52) U.S. Cl.
CPC ...... *C01B 2204/24* (2013.01); *C01P 2002/86* (2013.01); *C01P 2002/88* (2013.01)

(56) References Cited

U.S. PATENT DOCUMENTS

| | | | |
|---|---|---|---|
| 2015/0197660 | A1 | 7/2015 | Ronne et al. |
| 2015/0200403 | A1 | 7/2015 | Sundara et al. |
| 2016/0002047 | A1 | 1/2016 | Virtanen |

FOREIGN PATENT DOCUMENTS

| | | | | |
|---|---|---|---|---|
| JP | 2009537648 | A | | 10/2009 |
| JP | 2010168304 | A | | 8/2010 |
| JP | 2011505313 | A | | 2/2011 |
| JP | 2015527430 | A | | 9/2015 |
| KR | 20120104767 | A | | 9/2012 |
| KR | 20130139452 | A | | 12/2013 |
| KR | 20140047970 | A | | 4/2014 |
| KR | 101489174 | B1 | | 2/2015 |
| KR | 20150070765 | A | * | 6/2015 |
| KR | 20150070765 | A | | 6/2015 |
| KR | 20150139410 | A | | 12/2015 |

OTHER PUBLICATIONS

"Sodium Acrylate" SigmaAldrich <https://www.sigmaaldrich.com/catalog/product/aldrich/408220?lang=en&region=US> (2020).*

Zeng, Minxiang, et al. "Aqueous exfoliation of graphite into graphene assisted by sulfonyl graphene quantum dots for photonic crystal applications." ACS applied materials & interfaces 9.36 (2017): 30797-30804.*

Qin, Xiaoyun, et al. "Preparation of graphene platelet-Ru (phen) 3 2+ assemblies and their application in electrochemiluminescence detection." Russian Journal of Electrochemistry 49.11 (2013): 1092-1096.*

Cai, Wei, et al. "Functionalized graphene from electrochemical exfoliation for thermoplastic polyurethane: thermal stability, mechanical properties, and flame retardancy." Industrial & Engineering Chemistry Research 55.40 (2016): 10681-10689.*

Extended European Search Report including Written Opinion for Application No. EP17880392.0 dated May 6, 2019, pp. 1-6.

Search report from International Application No. PCT/KR2017/013192, dated Jul. 24, 2018.

Ghosh, Anupama, et al, "Noncovalent Functionalization, Exfoliation, and Solubilization of Graphene in Water by Employing a Florescent Coronene Carboxylate." Chemistry—A European Journal, Received Oct. 14, 2009; published online Jan. 27, 2010, vol. 16, pp. 2700-2704.

Yang, H., et al., "A Simple Method for Graphene Production Based on Exfoliation of Graphine in Water Using 1-pyrenesulfonic Acid Sodium Salt." Carbon, Received Aug. 24, 2012; Accepted Nov. 9, 2012; Available online Nov. 17, 2012, vol. 53, pp. 357-365.

Lonkar, Sunil P., "Recent Advances in Chemical Modifications of Graphene." Nano Research, Just Accepted Manuscript, DOI 10.1007/s12274-014-0622-9, http://www.thenanoresearch.com on Nov. 4, 2014, pp. 1-38.

* cited by examiner

(a) GNP 0.25 g / SA 1.0 g

(b) GNP 0.5 g / SA 1.0 g

METHOD FOR PREPARING FUNCTIONALIZED GRAPHENE

CROSS-REFERENCE TO RELATED APPLICATIONS

The present application is a national phase entry under 35 U.S.C. § 371 of International Application No. PCT/KR2017/013192 filed Nov. 20, 2017, which claims priority from Korean Patent Application No. 10-2016-0170680 filed on Dec. 14, 2016, the disclosures of which are incorporated herein by reference.

TECHNICAL FIELD

The present invention relates to a method for preparing a functionalized graphene.

BACKGROUND ART

Graphene is a semimetallic material where carbon atoms form an arrangement connected in a hexagonal shape by two-dimensional sp2 bonding while having a thickness corresponding to a carbon atom layer. Recently, it has been reported that the properties of a graphene sheet having one carbon atomic layer were evaluated, and as a result, it has been reported that the graphene sheet may show very excellent electrical conductivity of electron mobility of about 50,000 $cm^2/Vs$ or more.

In addition, graphene has the properties of structural and chemical stability and excellent thermal conductivity. Further, graphene consists of only carbon which is a relatively light element, and thus, easy to be processed in one-dimensional or two-dimensional nano-patterns. Due to such electrical, structural, chemical and economical properties, graphene is expected to replace a silicon-based semiconductor technology and a transparent electrode in the future, and especially, is possible to be applied to a flexible electronic device field due to excellent mechanical properties.

On the other hand, graphene tends to re-agglomerate due to its hydrophobic properties. Therefore, graphene does not disperse well in most organic solvents except for the solvents having similar surface energies such as NMP and DMF.

To solve these problems, by using an amphipathic dispersant, the hydrophobic portion of the dispersant is adsorbed on graphene surface and the hydrophilic portion can inhibit the aggregation of adjacent graphene to improve the dispersibility in a solvent. In the above method, since there is no chemical change of graphene itself, it is possible to maintain characteristics inherent to graphene, but there is a disadvantage in that it is difficult to maintain long-term dispersibility because the method is a physical bond.

As another method, there is a method of chemically bonding a compound for functionalization on graphene surface. Since the above method is a chemical bond, long-term dispersibility can be maintained, but there is a disadvantage in that a part of sp2 bond of graphene is changed to sp3 bond, and thus characteristics inherent to graphene are deteriorated, especially thermal conductivity and electrical conductivity are reduced. Furthermore, the above method has a problem that a complicated method is necessary for functionalization of graphene surface since the reactivity of graphene is low.

In this regard, the present inventors have conducted intensive studies on a method for functionalizing graphene, and found that graphene can be functionalized by a simple method of heat-treating graphene and a salt containing a double bond at a specific temperature as described later, thereby completing the present invention.

DETAILED DESCRIPTION OF THE INVENTION

Technical Problem

It is an object of the present invention to provide a method for preparing a functionalized graphene which can functionalize graphene by a simple method.

It is another object of the present invention to provide a functionalized graphene prepared by the above-described method.

Technical Solution

In order to achieve the above objects, the present invention provides a method for preparing a functionalized graphene comprising the steps of:

1) mixing graphene with a salt containing a double bond to prepare a mixture; and
2) heat-treating the mixture at 120 to 400° C.

Figure 1:
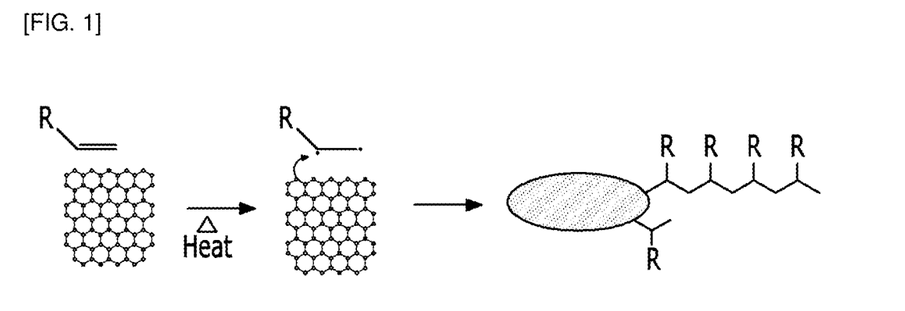
FIG. 1 schematically shows the principle of the present invention.

The method for preparing a functionalized graphene according to the present invention focuses on the fact that if the salt containing a double bond is heat-treated and thus the double bond is broken and activated, it reacts with adjacent graphene so that the salt containing a double bond can be functionalized on graphene surfaces. The mechanism thereof is schematically shown in FIG. 1.

As a result, the graphene and the salt containing a double bond react directly even without any other substances such as a reaction initiator, so that graphene can be functionalized by a simpler method than a conventional functionalization method of graphene. In addition, as the salt containing a double bond is functionalized in graphene, the hydrophilic properties are imparted to graphene, whereby water dispersibility of graphene can be improved.

Therefore, unlike conventionally known functionalization methods of graphene, the method of the present invention is simple and has the effect of being able to functionalize graphene without impairing the characteristic inherent to graphene.

Hereinafter, the method of the present invention will be described in detail for each step.

Mixing Graphene with a Salt Containing a Double Bond to Prepare a Mixture (Step 1)

Step 1 is a step of preparing the functionalization of graphene, and it is a step of mixing a graphene with a salt containing a double bond to prepare a mixture.

The salt containing a double bond is a substance in which the radical is activated by heat treatment of Step 2 described below and reacted with graphene to enable the functionalization of graphene. In addition, the salt containing a double bond may be functionalized in graphene to impart hydrophilicity to graphene, thereby improving water dispersibility of the functionalized graphene.

Preferably, as the salt containing a double bond, a compound represented by the following Chemical Formula 1 or 2 can be used:

[Chemical Formula 1]

in Chemical Formula 1,

R$^1$ is a single bond; a substituted or unsubstituted alkylene having 1 to 60 carbon atoms; or a substituted or unsubstituted arylene having 6 to 60 carbon atoms, X$^1$ is CO, or SO$_2$, and M$^1$ is an alkali metal,

[Chemical Formula 2]

in Chemical Formula 2,

R$^2$ is a substituted or unsubstituted alkenylene having 1 to 60 carbon atoms,

X$^2$ is CO, or SO$_2$, and

M$^1$ is an alkali metal.

The compound represented by Chemical Formula 1 contains a vinyl group at the end, and is a substance in which the radical of the vinyl group is activated by the heat treatment described below and reacted with graphene to enable the functionalization of graphene.

Preferably, R$^1$ is a single bond; or phenylene.

Preferably, M$^1$ is Na, or K.

Representative examples of the compound represented by Chemical Formula 1 include 4-styrenesulfonic acid sodium salt, sodium acrylate, or vinylsulfonic acid sodium salt.

In addition, the compound represented by Chemical Formula 2 contains a double bond in R$_2$, and is a substance in which the radical of the double bond is activated by the heat treatment described below and reacted with graphene to enable the functionalization of graphene.

Preferably, R$_2$ is ethenylene (—CH═CH—).

Preferably, M$^1$ is Na, or K.

Representative examples of the compound represented by Chemical Formula 2 include maleic acid sodium salt.

Preferably, the salt containing a double bond is mixed in an amount of 0.2 to 5.0 parts by weight, more preferably 0.5 to 4.0 parts by weight, based on 1 part by weight of graphene. When the salt containing a double bond is used in an amount of less than 0.2 part by weight based on 1 part by weight of the graphene, the degree of functionalization of graphene is insignificant. When the amount is more than 5.0 parts by weight, the degree of functionalization of graphene does not substantially increase.

On the other hand, a solvent may be used for uniform mixing of the graphene and the salt containing a double bond. Since the solvent all should be removed by the heat treatment of Step 2 described below, water is preferably used. Further, after mixing the graphene and the salt containing a double bond using the solvent, the method may further include removing the solvent before performing Step 2 described below.

Heat-Treating the Mixture (Step 2)

Step 2 is a step of heat-treating the mixture prepared in Step 1 described above to functionalize graphene.

The heat treatment is preferably performed at a temperature range of 120 to 400° C. so that a double bond of the double bond-containing salt can be activated and reacted directly with graphene. More preferably, the heat treatment is performed at a temperature range of 150 to 300° C.

Further, the heat treatment is preferably performed for 10 minutes to 24 hours so that a double bond of the double bond-containing salt is activated and reacted directly with graphene. More preferably, the heat treatment is performed for 10 minutes to 12 hours.

Further, in the present invention, since the double bond of the double bond-containing salt is activated and reacted directly with graphene, use of a separate reaction initiator is unnecessary. That is, the mixture prepared in Step consists of only graphene and a double bond-containing salt, and does not contain any other substance.

On the other hand, after Step 2, the method may include separating the functionalized graphene. The separation may include washing or filtering to remove residual material except the functionalized graphene.

Functionalized Graphene

In the functionalized graphene prepared according to the present invention, the salt containing a double bond is chemically bonded to the surface of graphene, whereby the functionalized graphene has an increased hydrophilicity. That is, there is an advantage in that hydrophilic properties are imparted to graphene and thus the dispersibility in a polar solvent is increased.

In addition, since the functionalized graphene according to the present invention does not use any other substance except for the graphene and the salt containing a double bond in the manufacturing process, it does not substantially contain substances that may impair the properties of graphene. Hence, it has an effect of imparting hydrophilic properties while exhibiting characteristics inherent to graphene.

Furthermore, unlike the conventional functionalization method of graphene, the present invention can function graphene by a simple method, and can more easily improve the characteristics of graphene.

Advantageous Effects

As described above, the method for preparing a functionalized graphene according to the present invention can functionalize graphene by a simple method and does not use any other substance other than graphene and a salt containing a double bond, thereby enabling functionalization of graphene while exhibiting characteristics inherent to graphene.

BRIEF DESCRIPTION OF DRAWINGS

FIG. 5 shows NMR data of a functionalized graphene according to an embodiment of the present invention.

DETAILED DESCRIPTION OF THE EMBODIMENTS

Hereinafter, preferred examples are provided for better understanding of the invention. However, these Examples are given for illustrative purposes only and are not intended to limit the scope of the present invention thereto.

Example 1: Functionalization of Graphene Using 4-styrenesulfonic Acid Sodium Salt 1) TGA and DSC Analysis of 4-styrenesulfonic Acid Sodium Salt In order to determine the heat treatment temperature of 4-styrenesulfonic acid sodium salt (hereinafter referred to as 'SS'), TGA and DSC data were measured when SS was heated from room temperature to 900° C. under a nitrogen atmosphere, and the results are shown in FIG. 2.

Figure 2:
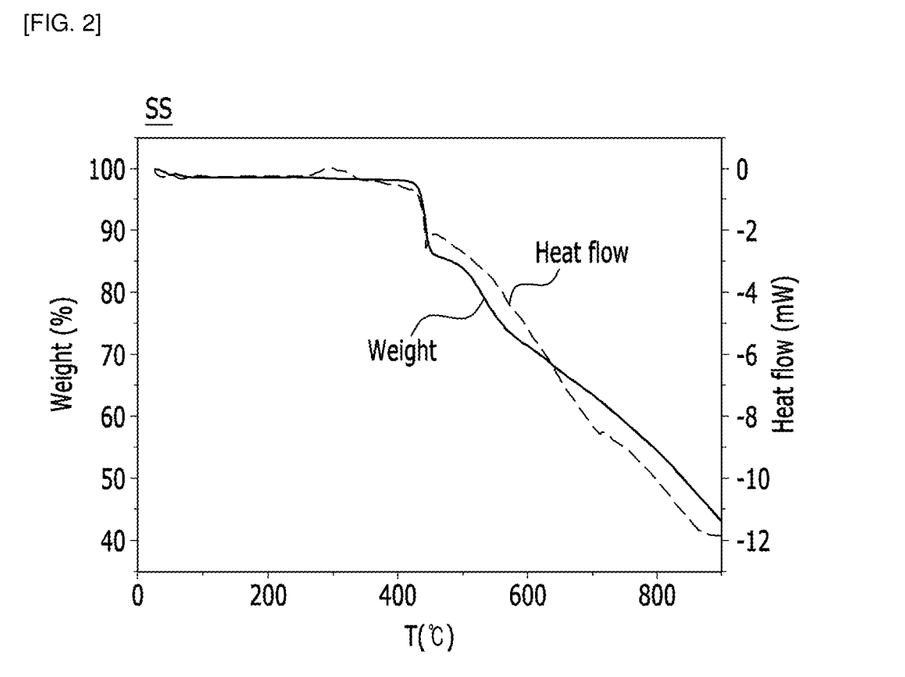
FIG. 2 shows TGA and DSC data of 4-styrenesulfonic acid sodium salt used in one embodiment of the present invention.

As shown in FIG. 2, it was confirmed that an exothermic reaction occurred at about 300° C. Therefore, the heat treatment temperature with graphene was set to 300° C. in the following.

2) Method of Preparing Functionalized Graphene 0.5 g of graphene and 1.0 g of SS were mixed with 20 mL of water. The mixture was dried to remove water, and then heat-treated in a tube furnace at 300° C. for 10 minutes. The product was washed with water and then filtered to prepare a functionalized graphene.

3) Evaluation of Dispersion Stability

For comparison, 1) a composition obtained by mixing 0.5 g of graphene and 1.0 g of SS, 2) a composition obtained by mixing 1.0 g of SS heat-treated at 300° C. for 10 minutes with 0.5 g of graphene, 3) a composition obtained by mixing 0.5 g of graphene and 1.0 g of PSS (polystyrenesulfonate; Mw: 75,000) were prepared.

Figure 3:
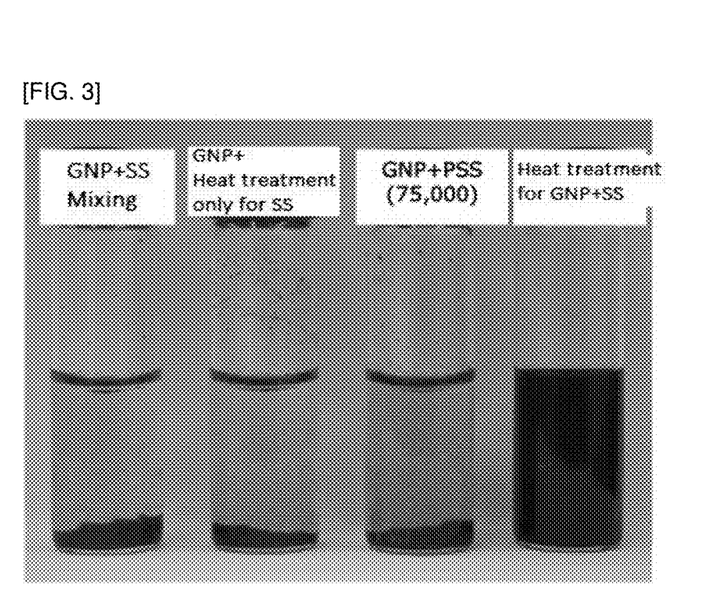
FIG. 3 shows the dispersibility of a functionalized graphene according to one embodiment of the present invention.

The functionalized graphene previously prepared and the compositions were added to water at a concentration of 2 mg/ml and redispersed, and the results are shown in FIG. 3.

As shown in FIG. 3, the functionalized graphene prepared in Example 1 was excellent in water dispersibility, and the remainder all precipitated.

4) Evaluation of Dispersion Stability

The functionalized graphenes previously prepared were added to water at 2 mg/ml, 4 mg/ml, 6 mg/ml, and 8 mg/ml, respectively, and whether or not to precipitate over time was confirmed. The results are shown in FIG. 4.

Figure 4:
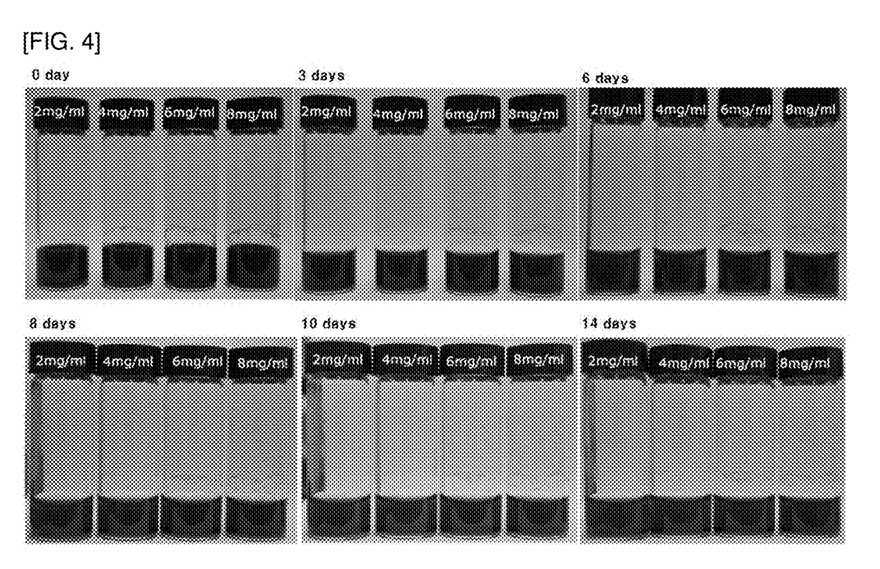
FIG. 4 shows the dispersion stability of a functionalized graphene according to one embodiment of the present invention.

As shown in FIG. 4, when observed with the naked eye, the dispersibility by concentration was similar and some precipitates were confirmed from 3 days later, but the dispersibility was remarkably maintained even after the lapse of 2 weeks.

5) Evaluation of Radical Activity of Double Bond According to Heat-Treatment Time Functionalized graphene was prepared in the same manner as in the above-mentioned '2) Method of preparing functionalized graphene', except that the heat treatment was performed in a tube furnace at 300° C. for 2 hours.

Figure 5A:
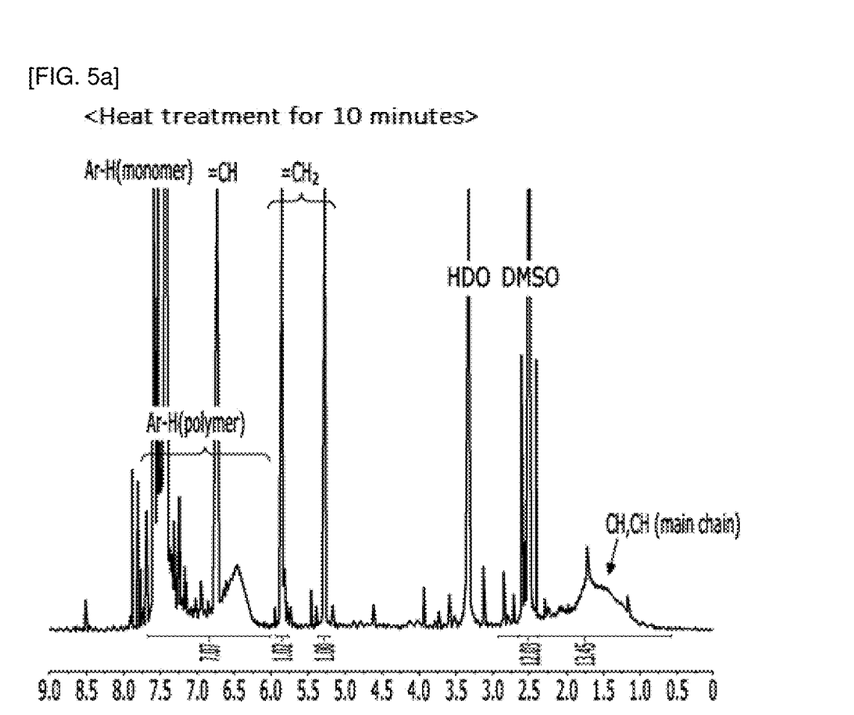
FIG. 5(a) shows the case where the heat treatment time is 10 minutes.
Figure 5B:
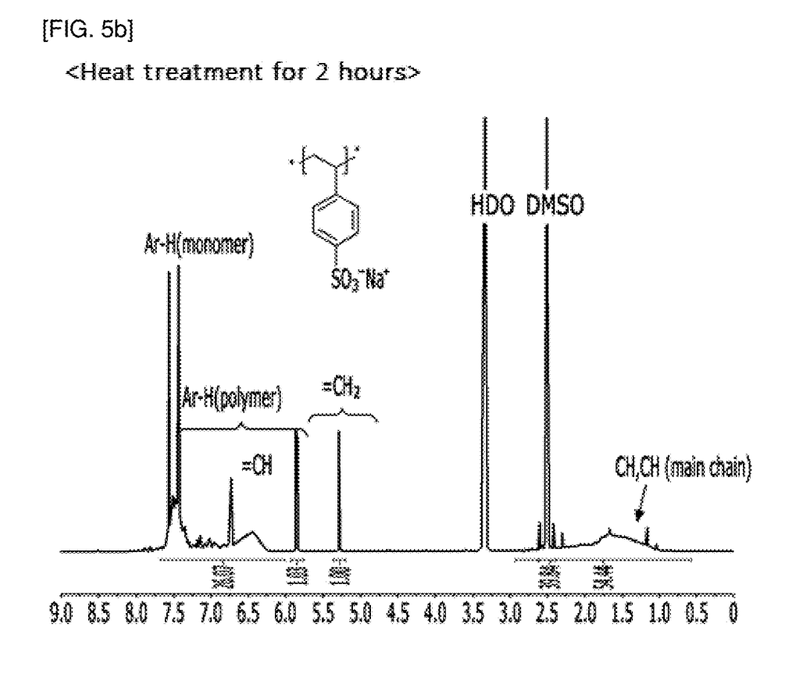
FIG. 5(b) shows the case where the heat treatment time is 2 hours.

NMR (DMSO-$d_6$, Bruker 700 MHz NMR) of the respective functionalized graphenes prepared was measured, and the results are shown in FIG. 5.

As shown in FIG. 5, it was confirmed that as the heat treatment time was increased, the rate of conversion from monomer to polymer (or oligomer) was increased. This is due to an increase in the radical activity of the double bond present in SS when the heat treatment time is increased.

6) Evaluation of Degree of Binding Between Graphene and SS

Figure 6A:
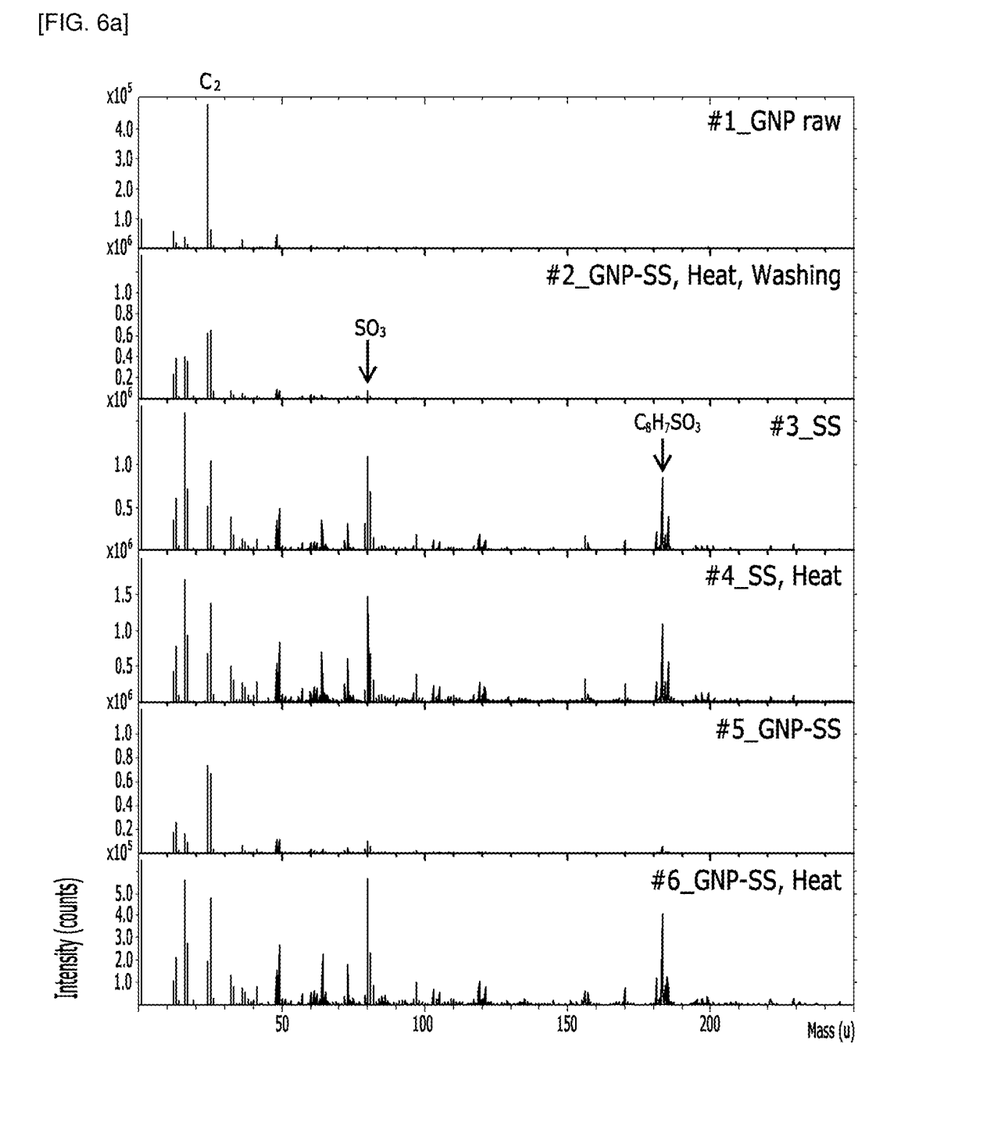
FIG. 6 shows TOF-SIMS analysis result of a functionalized graphene according to one embodiment of the present invention.
Figure 6B:
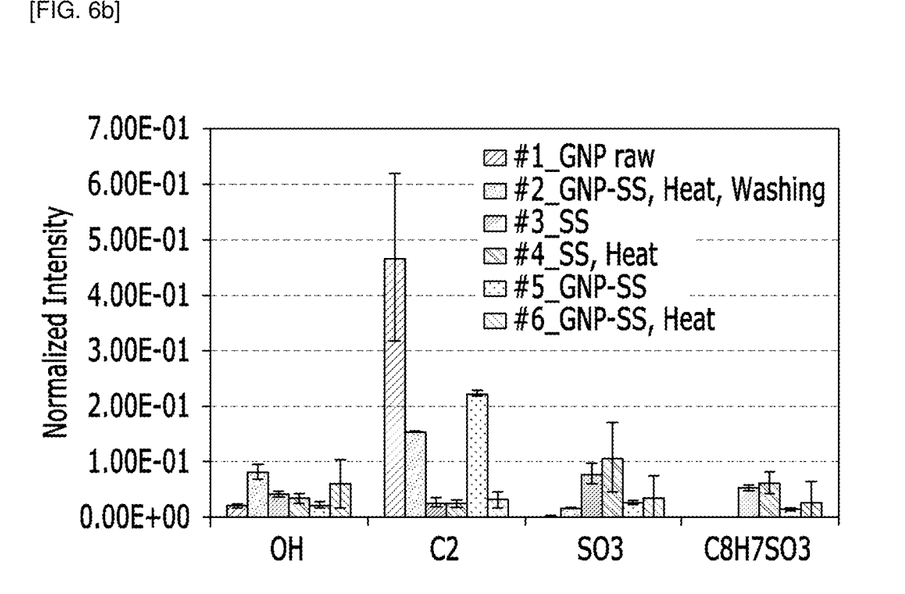

The degree of binding of SS to graphene in the functionalized graphene prepared above was evaluated. Specifically, a total of six samples of #1 (graphene alone), #2 (functionalized graphene prepared in the above-mentioned '2) Method of preparing functionalized graphene'), #3 (SS alone), #4 (heat treatment of SS alone at the same temperature and time as #2), #5 (a mixture of GNP and SS (no heat treatment)), and #6 (graphene prepared by omitting washing with water, in functionalized graphene prepared in '2) Method of preparing functionalized graphene') were analyzed by TOF-SIMS (Time-of-Flight Secondary Ion Mass Spectrometry). The results are shown in FIG. 6.

In TOF-SIMS, when the sample surface is beaten by a primary ion, a portion forming a relatively weak bond is detected at the detector. As shown in FIG. 6, $C_8H_7SO_3$ present in #3 is detected in most of the samples, but in the case of #2, it can be confirmed that the amount detected is insignificant. Therefore, it can be confirmed that the functionalized graphene according to the present invention has a strong bond between graphene and SS.

Example 2: Functionalization of Graphene Using Sodium Acrylate

1) TGA and DSC Analysis of Sodium Acrylate

Figure 7:
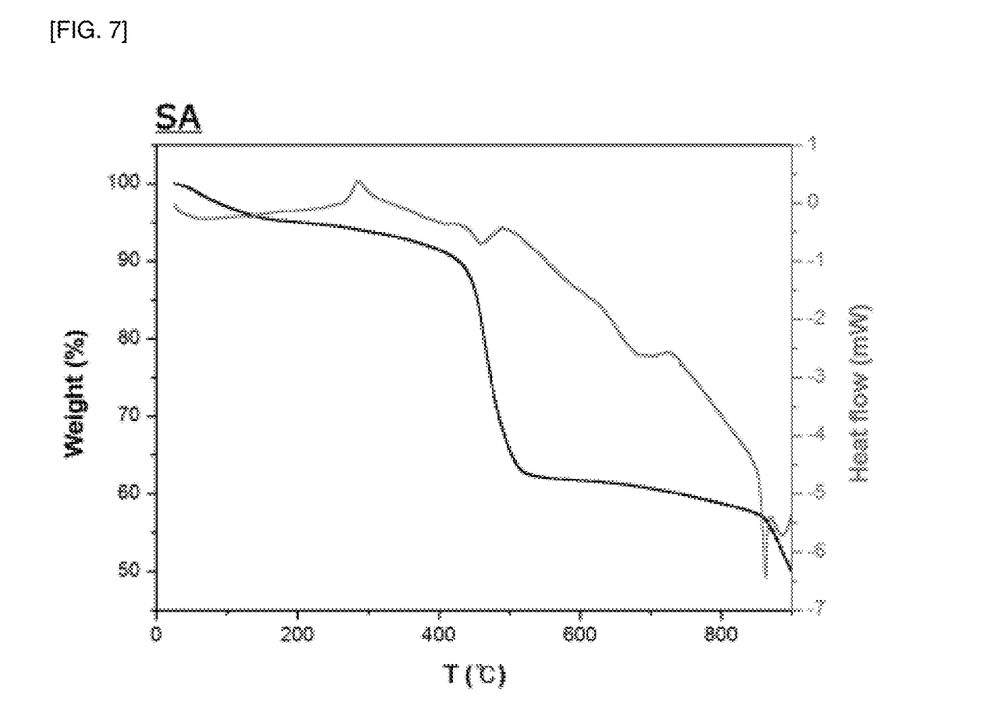
FIG. 7 shows TGA and DSC data of sodium acrylate used in one embodiment of the present invention.

In order to determine the heat treatment temperature of sodium acrylate (hereinafter referred to as 'SA'), TGA and DSC data were measured when SA was heated from room temperature to 900° C. under a nitrogen atmosphere, and the results are shown in FIG. 7.

As shown in FIG. 7, it was confirmed that an exothermic reaction occurred at about 300° C. Therefore, the heat treatment temperature with graphene was set to 300° C. in the following.

2) Preparation of Functionalized Graphene 0.25 g of graphene and 1.0 g of SA were mixed with 20 mL of water. The mixture was dried to remove water, and then heat-treated in a tube furnace at 150° C., 200° C., 250° C. and 300° C. for 10 minutes, respectively. The respective products were washed with water and then filtered to prepare a functionalized graphene.

In addition, 0.5 g of graphene and 1.0 g of SA were mixed with 20 mL of water. The mixture was dried to remove water, and then heat-treated in a tube furnace at 150° C. (10 min), 200° C. (10 min), 250° C. (10 min), 300° C. (10 min) and 300° C. (2 hr). The respective products were washed with water and then filtered to prepare a functionalized graphene.

3) Evaluation of Dispersion Stability

The functionalized graphenes prepared above were added respectively to water, ethanol and methanol at a concentration of 1.5 mg/ml and dispersed, and whether or not to precipitate over time was confirmed. The results are shown in FIG. 8.

Figure 8:
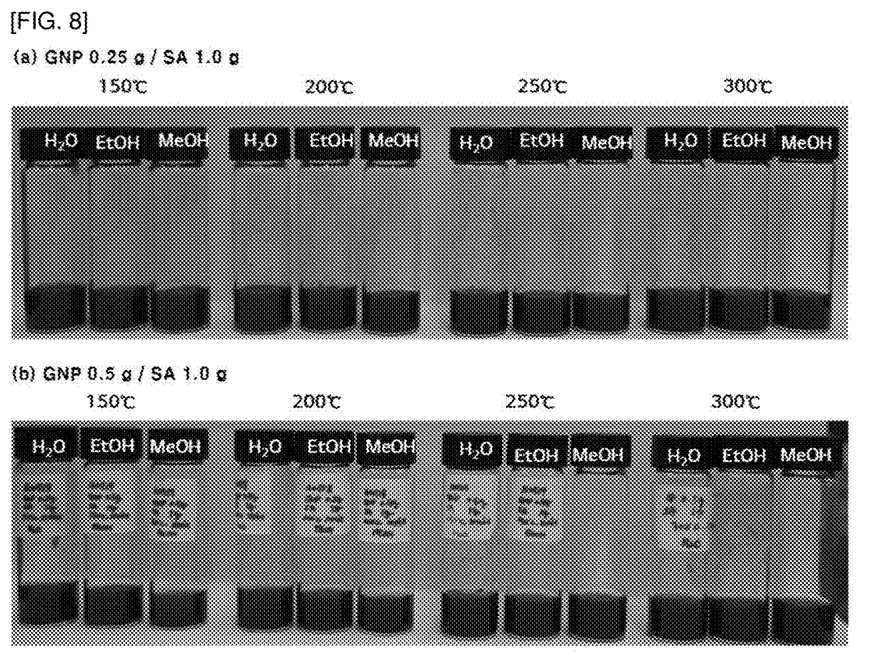
FIG. 8 shows the dispersibility of a functionalized graphene according to one embodiment of the present invention.

As shown in FIG. 8, precipitates hardly occurred even after the lapse of 2 weeks.

Example 3: Functionalization of Graphene Using Maleic Acid Sodium Salt

1) Preparation of Functionalized Graphene 0.5 g of graphene and 1.0 g of maleic acid sodium salt (hereinafter referred to as 'MA') were mixed with 20 mL of water. The mixture was dried to remove water, and then heat-treated in a tube furnace at 300° C. for 10 minutes. The product was washed with water and then filtered to prepare a functionalized graphene (A).

In addition, 0.5 g of graphene and 1.0 g of MA were mixed with 20 mL of water. The mixture was dried to remove water, and then heat-treated in a tube furnace at 300° C. for 20 hours. The product was washed with water and then filtered to prepare a functionalized graphene (B).

2) Evaluation of Dispersion Stability

The functionalized graphenes prepared above were added respectively to water at a concentration of 1.5 mg/ml and dispersed, and whether or not to precipitate over time was confirmed. The results are shown in FIG. 9.

Figure 9:
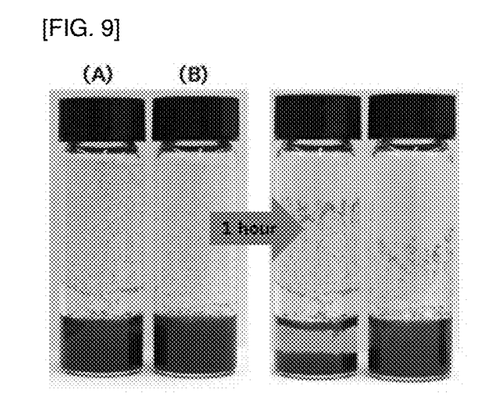
FIG. 9 shows the dispersibility of a functionalized graphene according to one embodiment of the present invention.

As shown in FIG. 9, in the case of (A), some precipitates occurred after 1 hour, but in the case of (B) with the longer heat treatment time, the dispersion stability was excellent, which means that the degree of reaction with graphene increases with the heat treatment time.

In addition, the functionalized graphenes (B) prepared above were added respectively to ethanol, acetone, THF, NMP and toluene at a concentration of 1.5 mg/mL and dispersed, and whether or not to precipitate over time was confirmed. The results are shown in FIG. 10.

Figure 10:
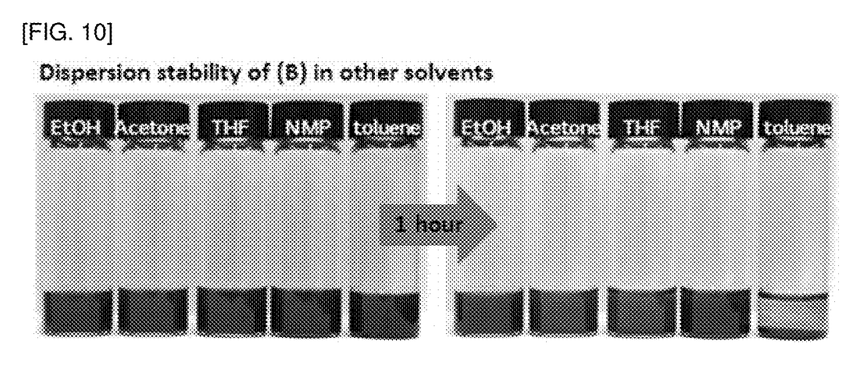
FIG. 10 shows the dispersibility of a functionalized graphene in various solvents according to an embodiment of the present invention.

As shown in FIG. 10, the dispersibility in most of the solvents was excellent, and particularly, the dispersibility in ethanol and NMP was excellent.

The invention claimed is:

1. A method for preparing a functionalized graphene, comprising:
   1) mixing graphene with a salt containing a double bond to prepare a mixture;
   2) heat-treating the mixture at 150 to 300° C., and
   3) forming the functionalized graphene.

2. The method of claim 1,
   wherein the salt containing a double bond is a compound represented by the following Chemical Formula 1 or 2:

[Chemical Formula 1]

in Chemical Formula 1,
$R^1$ is a single bond; a substituted or unsubstituted alkylene having 1 to 60 carbon atoms; or a substituted or unsubstituted arylene having 6 to 60 carbon atoms,
$X^1$ is CO, or $SO_2$, and
$M^1$ is an alkali metal,

[Chemical Formula 2]

in Chemical Formula 2,
$R^2$ is a substituted or unsubstituted alkenylene having 1 to 60 carbon atoms,
$X^2$ is CO, or $SO_2$, and
$M^2$ is an alkali metal.

3. The method of claim 2,
   wherein $R^1$ is a single bond; or phenylene.

4. The method of claim 2,
   wherein $R^2$ is ethenylene (—CH=CH—).

5. The method of claim 2,
   wherein the salt containing a double bond is 4-styrene-sulfonic acid sodium salt, sodium acrylate, maleic acid sodium salt, or vinylsulfonic acid sodium salt.

6. The method of claim 2,
   wherein the salt containing a double bond is mixed in an amount of 0.2 to 5.0 parts by weight based on 1 part by weight of graphene.

7. The method of claim 2,
   wherein the heat treating is performed for 10 minutes to 24 hours.

* * * * *